No. 817,290. PATENTED APR. 10, 1906.
H. L. YOUNG.
ELECTRIC RAILWAY SWITCHING MECHANISM.
APPLICATION FILED OCT. 5, 1905.
4 SHEETS—SHEET 1.
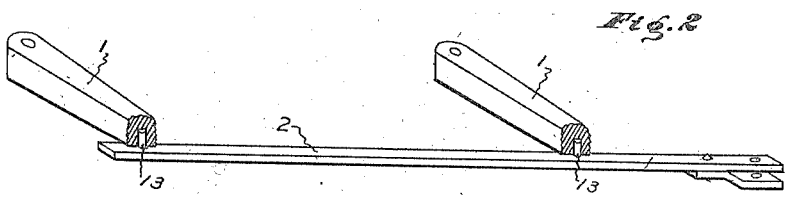
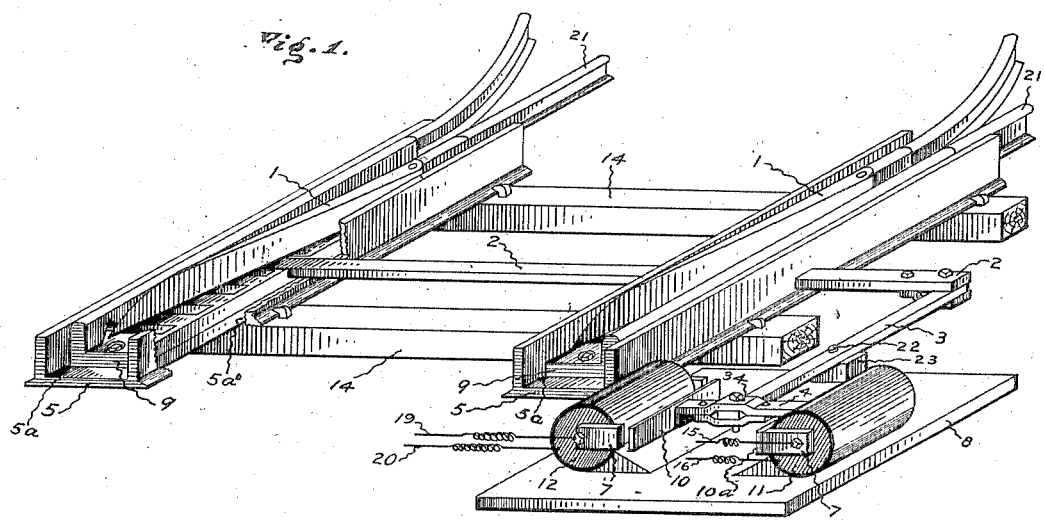
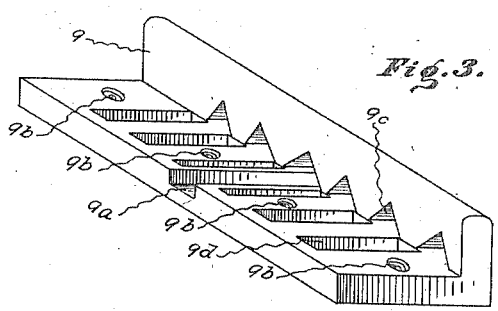

No. 817,290. PATENTED APR. 10, 1906.
H. L. YOUNG.
ELECTRIC RAILWAY SWITCHING MECHANISM.
APPLICATION FILED OCT. 5, 1905.
4 SHEETS—SHEET 2
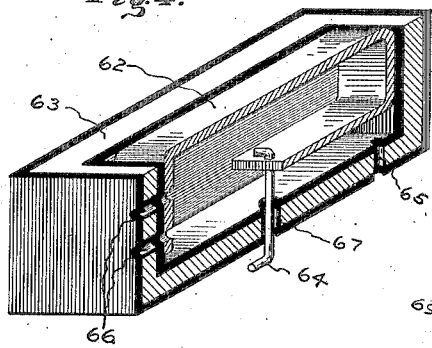
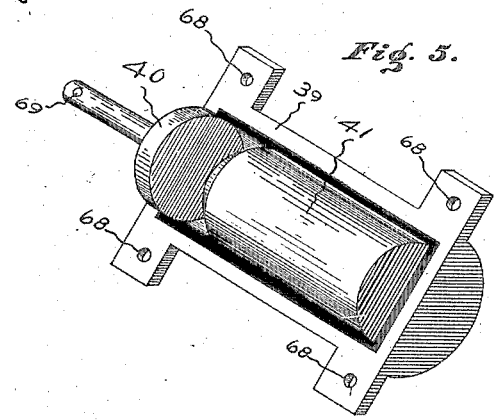
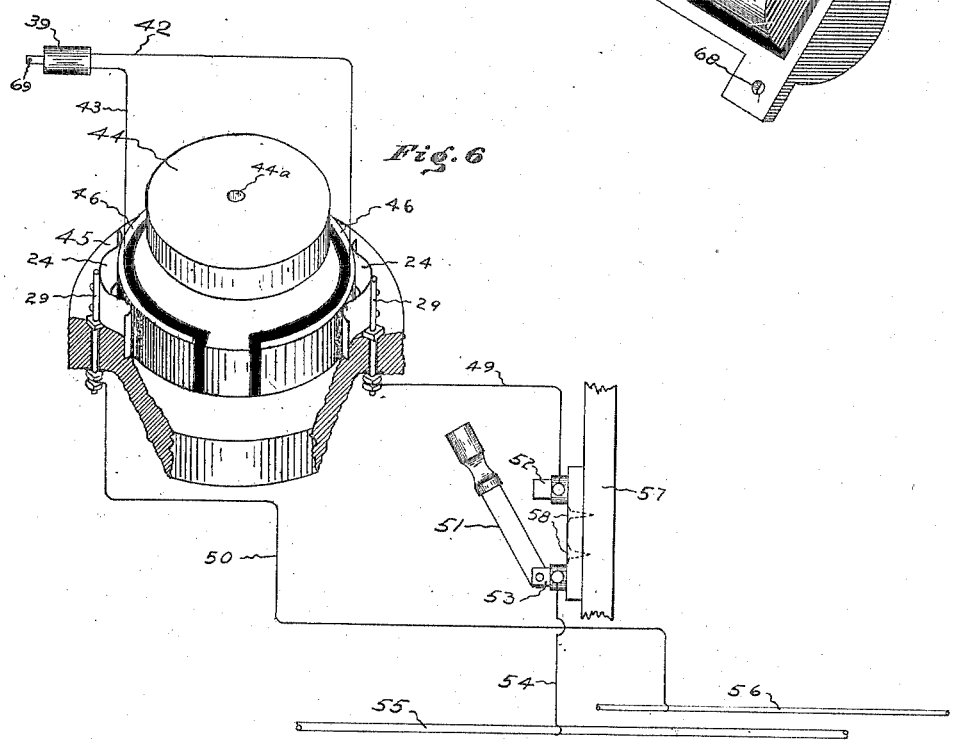
Witnesses.
Albanus S. T. Johnson
A. L. Lansdale
Inventor.
Harry Luther Young
By Horace N. Clark
Attorney.

No. 817,290. PATENTED APR. 10, 1906.
H. L. YOUNG.
ELECTRIC RAILWAY SWITCHING MECHANISM.
APPLICATION FILED OCT. 5, 1905.
4 SHEETS—SHEET 3.
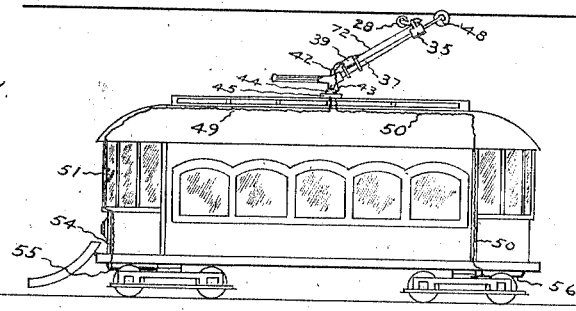
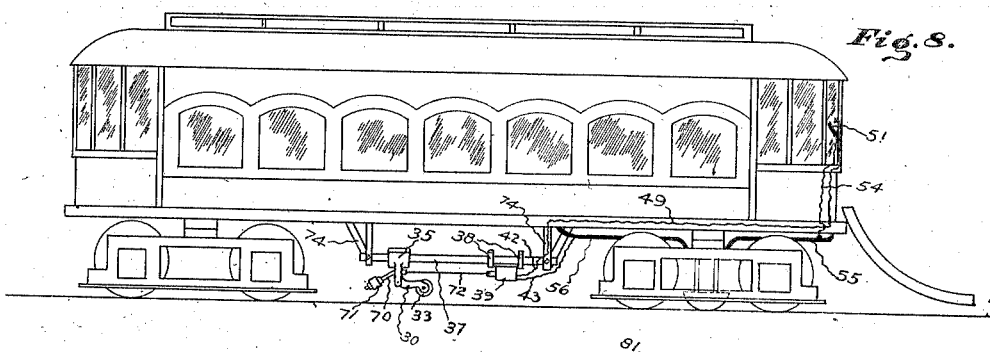
Witnesses.
Inventor.
Harry Luther Young
By ........ Clark
Attorney No. 817,290. PATENTED APR. 10, 1906.
H. L. YOUNG.
ELECTRIC RAILWAY SWITCHING MECHANISM.
APPLICATION FILED OCT. 5, 1905.
4 SHEETS—SHEET 4.
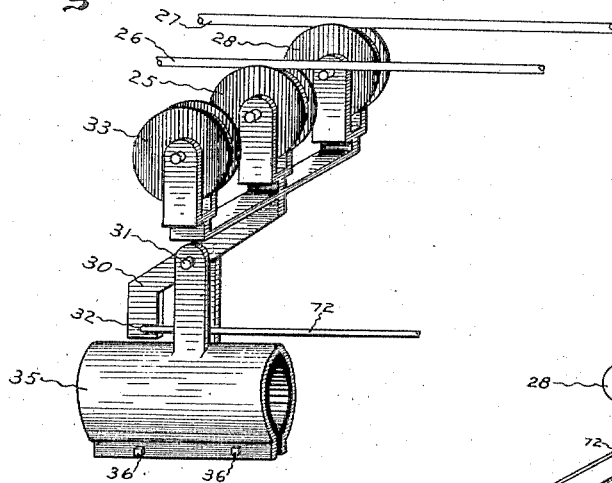
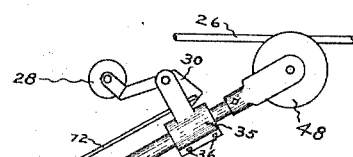
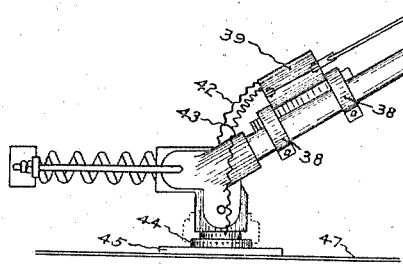
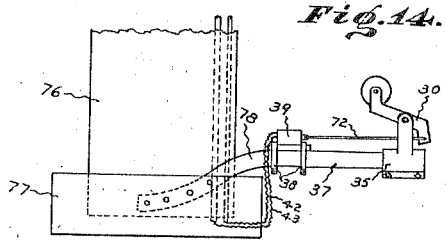
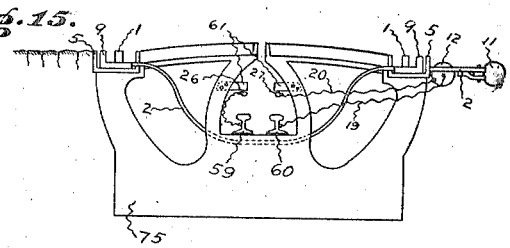
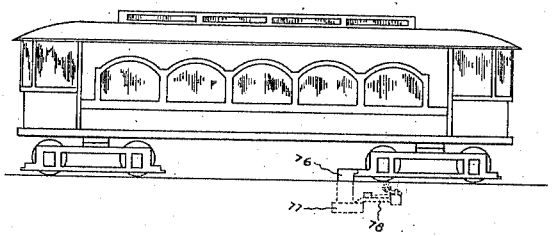
Witnesses.
Inventor.
Harry Luther Young
By
Attorney.

UNITED STATES PATENT OFFICE.

HARRY LUTHER YOUNG, OF PUEBLO, COLORADO.

ELECTRIC RAILWAY SWITCHING MECHANISM.

No. 817,290.  Specification of Letters Patent.  Patented April 10, 1906.

Application filed October 5, 1905. Serial No. 281,470.

*To all whom it may concern:*

Be it known that I, HARRY LUTHER YOUNG, a citizen of the United States, residing at Pueblo, in the county of Pueblo and State of Colorado, have invented new and useful Improvements in Electric Railway Switching Mechanism, of which the following is a specification.

My invention relates to electric railway-switches, and has for its principal objects the production of improved switch constructions, means for electrically operating railway-switches, and electrical means under control of a car operator, motorman, or engineer for controlling the switch-operating means.

Among other objects of the invention may be mentioned the improvement in the car-carried contacts or trolleys by means of which current may be supplied to the switch-operating mechanism, the provision of electromagnetically-operated means for governing said car-carried contacts or trolleys, the electrical connections from the car-circuits to said electromagnetic operating means, the electromagnetic switch-operating mechanism, the special construction of the track-switch itself by which accumulation of dirt and debris is prevented, and in the improvement in various details of electric railway switching mechanism. I attain these objects by, and my invention consists in, the mechanisms described and claimed hereinafter and illustrated in the accompanying drawings, in which—

Figure 1 is a perspective view of a railway-track switch and electromagnetic operating mechanism, the latter being shown exposed and a part of one of the switch-guards being broken away for purposes of better illustration. Fig. 2 is a similar view showing a detail of the switch-point connection. Fig. 3 is a similar view, enlarged, of my improved combined switch-rail and base adapted to prevent accumulation of dirt and debris about the switch-point. Figs. 4 and 5 are detached perspective views of a preferred form of surface spring-contact and trolley-operating electromagnet, respectively. Fig. 6 is a perspective view of the trolley-pole base and contacts. Fig. 7 is a view in elevation, showing a trolley-car of the "overhead-trolley" type equipped with my invention. Fig. 8 is a similar view showing my invention applied to a trolley-car of the "surface-contact" or "third-rail" type. Fig. 9 is a plan view of track-switch mechanism and wiring for the surface-contact or third-rail trolley system. Fig. 10 shows similarly the track-switch mechanism and wiring for the overhead-trolley system. Figs. 11 and 12 are enlarged detail views in perspective and elevation, respectively, of the overhead-trolley construction. Fig. 13 is a view in elevation, showing a trolley-car of the "conduit" or "underground" type equipped with my invention. Fig. 14 is an enlarged detail showing the mounting of the switch-controlling trolley for the conduit system; and Fig. 15 is a view, partly in transverse section, showing the switch, switch-operating mechanism, and contact-conductor arrangement for the conduit system.

Referring to the drawings, in which like reference characters designate corresponding or similar parts throughout the various figures, 1 1 represent movable switch-points of a railway-track switch, which are suitably pivoted to the track structure and connected by an operating-bar 2. As shown in Fig. 2, bar 2 is loosely or pivotally connected by pins 13 to switch-points 1. Bar 2 is pivotally connected to a lever 3, fulcrumed at 22 to a block 23 upon a base 8. Lever 3, and consequently the switch-points, are adapted to be operated in either direction by electromagnets 11 12, having pole-pieces 7 and mounted upon base 8, one upon each side of said lever, the armatures 10 of the electromagnets being mounted upon rod 4, which is connected by pivot 34 to the end of lever 3.

In order to prevent accumulation of dirt and debris about the switch-points, I preferably provide the special mounting for them shown in Figs. 1 and 2, by which the movement of the switch-points automatically removes any dirt which may have settled in the space in which it is mounted. To effect this, I provide a switch-rail 9, having an upright tread portion in alinement with the track-rail and a horizontal base portion upon which the movable switch-point 1 rests and is adapted to move. Rail 9 is bolted, as at $9^b$, to supporting guard or chair 5, which in turn is spiked to cross-ties 14. Rail 9 is slotted at $9^a$ to form a rest for operating-rod 2 and along its base portion has a series of perforations $9^d$ to permit dirt to drop through.

The upright portion of rail 9 is also provided with a series of perforations 9°, which are preferably staggered with relation to the perforations 9ᵈ, so that any dirt which fails to fall through the latter may be pushed through the former by the movement of the switch-point.

The bottom of the switch-guard 5 is perforated to match the base-perforations of rail 9 and has a slotted opening or channel 5ᵃ along each side of said rail, through which dirt pressed outwardly by switch-point 1 may fall, and beneath the whole structure a suitable pit or recess may be constructed, from which accumulated dirt may be removed when necessary. It will thus be seen that any considerable accumulation of dirt about the switch-points, which might interfere with their movement, is prevented.

It will be understood that while I have described two movable switch-points for a single switch this is not absolutely necessary, as one movable point only may sometimes be employed, also that the form of the switching-magnets may be varied when found desirable or to suit special conditions, and a suitable cover for the protection of this apparatus is of course provided. It will also be understood that various changes may be made in the details of the dirt-eliminating switch-rail and base. For instance, the guard or chair 5 may sometimes be modified or even omitted and said switch-rail and base spiked directly to the cross-ties.

The track-switch as thus constructed is adapted for use particularly in an electric railway of the overhead-trolley type, of which a car is shown in Fig. 7, track-circuits in Fig. 10, and various details in Figs. 5, 6, 11, and 12; but by certain modifications to be hereinafter described my invention may be applied to the surface-contact or third-rail system and to the underground or conduit system.

Referring now particularly to Figs. 1, 5, 6, 7, 10, 11, and 12, the track-switch-magnet 11 is connected by conductor 16 with a short supplemental conductor 27, mounted parallel with and adjacent to the trolley-supply conductor 26, but insulated therefrom by insulated supports 80. The other side of the circuit is through conductor 15 to ground at rail 21. Similarly, magnet 12 is connected by conductor 19 to supplementary conductor 27ᵃ and by conductor 20 to ground. 82 represents supporting-posts for the trolley-conductors. Supplementary conductors 27 and 27ᵃ are insulated from each other by an insulating-section 79, and it will be understood that these conductors and the insulating-section 79 may be of any desired length and are placed at a suitable distance from the track-switch for the operation of which they are intended. The supplementary conductors are designed to be supplied with current from the trolley-supply conductor 26 by means of an auxiliary trolley 30, mounted on pivot 31 and secured by means of a split sleeve 35 and bolts 36 near the upper end of trolley-pole 37. The trolley-pole may be of any well-known or preferred construction and is provided with the usual main trolley 48, sleeve 35 being insulated from the pole by insulating-bushing, as shown in Fig. 11. Supplementary trolley 30 has three contact-wheels, of which 25 is adapted to engage the supply-conductor 26 and 28 or 35 to engage the supplementary conductors, according to which side of the supply-conductor they are mounted or in which direction the car is going. The three wheels or contacts of the auxiliary conductor are in electrical connection with each other. In order to operate the auxiliary trolley to bring it when desired into engagement with the conductors, I provide an electromagnet 41, mounted within a casing 39, which is attached by straps or bands 38 to the trolley-pole, preferably near its base. Casing 39 may be made in halves, as shown in Fig. 5, fastened together by bolts passing through perforations 68. Armature 40 of the electromagnet 41 is connected with the auxiliary trolley 30 by cord 72, attached at 69 and 32, so that when said armature is attracted the auxiliary trolley will be raised to engage the conductors. Magnet 41 is preferably energized from the car-circuit through conductors 42 43, which connect with insulated contact-pieces 46 upon the pole-base 44, the latter being swiveled to the car-top 47 at 44ᵃ. Contact-pieces 46 are preferably curved on the arc of a circle and are each engaged by a contact-spring 24, mounted upon posts 29, which are connected by wires 49 and 50 to the car-circuit 55 56 through the switch-blade 51 and elements 52 and 53. This switch is mounted upon a suitable part 57 of the car-frame by screws 58 within easy reach of the motorman, as shown in Fig. 7. By means of the construction of contacts 46 and 24 connection with magnet 41 is always possible in all operative positions of the pole, as in going around curves. The entire base is preferably inclosed by a cap, as shown by dotted lines in Fig. 12.

From the foregoing description the general operation of the system will be readily apparent. When a car or train approaches a track-switch which it is desired to operate, suppose to close the switch, the motorman closes his hand-switch 51 at such a time as to bring the auxiliary trolley 30 in contact with supplementary conductor 27 and trolley-conductor 26, thereby bridging these conductors and energizing track-magnet 11, which attracts its armature 10ᵃ and draws over the switch-points 1 to close the switch. The circuit of magnet 41 is then opened.

When it is desired to open the track-switch, the auxiliary trolley is similarly brought into engagement with supplementary conductor 27ª, thereby energizing magnet 12, which attracts armature 10 and opens the switch.

In Fig. 8 I have shown a car of the surface-contact type (adapted also for elevated roads) in which the auxiliary trolley is mounted on a rod 37, supported by brackets 74 beneath the car. In this case the trolley engages the supplementary conductors from above, and hence is provided with a counterweight 71, mounted on arm 70. Also instead of supplementary wires I provide spring-contacts 62 62ª. (Shown in Fig. 9 and in detail in Fig. 4.) The spring 62 (and 62ª) is mounted in an insulated casing 63 by bolts passing through holes 66, the circuit connection being made by wire 64 passing through hole 67. A drainage-aperture is also provided.

In Figs. 13, 14, and 15 I have shown my invention applied to a railway of the conduit type. Here the auxiliary trolley is mounted on a rod carried by an arm 78, attached to plow 76 inside of or beneath shoe 77, and bears on conductors 26 27, mounted within the conduit on brackets 61. Here I preferably curve the switch-rod 2 to pass beneath conductor-rails 59 60. Otherwise the construction is quite similar to that already described.

Having described my invention, what I claim as new, and desire to secure by Letters Patent of the United States, is—

1. In an electric railway switching mechanism, the combination with a railway-track, a movable switch-point, and a supply-conductor, of electromagnetic means for operating said switch-point, a supplemental conductor having a connection to said electromagnetic means, a car-carried main trolley to engage said supply-conductor, a pivotally-mounted auxiliary trolley adapted to engage and electrically connect said supply and supplementary conductors, and electromagnetic means for controlling said auxiliary trolley, substantially as described.

2. In an electric railway switching mechanism, the combination with a track-switch and electromagnetic means for operating the same, of a supply-conductor extending along the way and a supplementary conductor in proximity to the switch and connected to said electromagnetic means, a pivotally-mounted car-carried trolley adapted to engage and electrically connect said supply and supplementary conductors, and electromagnetic means under control of the motorman for controlling said auxiliary trolley, substantially as described.

3. In an electric railway switching mechanism, the combination with a movable switch-point, of an operating-bar therefor, a lever pivotally mounted and connected to said bar, two electromagnets operatively related to said lever, a supply-conductor, two supplementary conductors each connected to one of said electromagnets, and an electromagnetically-controlled car-carried trolley adapted to engage said conductors and supply current to either of said electromagnets at will, substantially as described.

4. The combination with a car, of a trolley-pole carrying a main trolley mounted thereon, an electrically-operated auxiliary bridging-trolley pivotally mounted on but insulated from said trolley-pole, substantially as described.

5. The combination with a car, of a trolley-pole carrying a main trolley mounted thereon, an auxiliary bridging-trolley in proximity to said main trolley and pivotally mounted on but insulated from said trolley-pole, and an electromagnetic operating device also mounted on said trolley-pole and connected to said auxiliary bridging-trolley, substantially as described.

6. In an electric railway switching mechanism, the combination with an electrically-operated railway-switch, of a supply-conductor, a supplemental conductor connected to the switch-operating mechanism, a car-carried main trolley to engage said supply-conductor, and a pivotally-mounted electrically-operated auxiliary trolley adapted to bridge and electrically connect said supply and supplemental conductors, substantially as described.

7. Means for controlling electrically-operated railway-switches, said means comprising a trolley-pole in combination with a trolley pivotally mounted near the upper end thereof but insulated therefrom, an electromagnet mounted on said pole and operatively connected with said trolley, and a switch under control of the motorman in electrical connection with said electromagnet, substantially as described.

8. Means for controlling electrically-operated railway-switches, said means comprising a trolley-pole swivelly mounted upon a car, said pole having a base provided with laterally-exposed contact-strips, springs fixedly mounted to engage said strips, connections from said springs to a source of electrical supply, an electromagnet mounted upon said pole connected to said strips, and a trolley pivotally mounted on said pole and operatively connected to the movable element of said electromagnet, substantially as described.

9. The combination with a car, of a trolley-pole swivelly mounted thereon, said pole having a base provided with laterally-exposed contact-strips, springs fixedly mounted to engage said strips, connections from said springs to a source of electrical supply, an electromagnet mounted upon said pole connected to said strips, a trolley pivotally mounted on said pole and operatively connected to the movable element of said electromagnet, and a controlling-switch for said electromagnet, substantially as described.

In testimony whereof I have signed my name to this specification in the presence of two subscribing witnesses.

HARRY LUTHER YOUNG.

Witnesses:
W. M. DOHERTY,
JAS. F. MCMAHON.